June 26, 1928.

Re. 17,011

A. FRIDOLPH

SHOULDER STRAP

Original Filed July 21, 1924

INVENTOR,
Annette Fridolph,
BY
W. J. Benedict
ATTORNEY.

Reissued June 26, 1928. Re. 17,011

UNITED STATES PATENT OFFICE.

ANNETTE FRIDOLPH, OF NEW YORK, N. Y., ASSIGNOR TO A. B. A. SPECIALTIES COMPANY, INC., OF NEW YORK, N. Y., A CORPORATION OF NEW YORK.

SHOULDER STRAP.

Original No. 1,544,386, dated June 30, 1925, filed July 21, 1924, Serial No. 727,235. Application for reissue filed April 27, 1927. Serial No. 187,086.

This invention relates to undergarments and particularly to undergarments which are supported by shoulder straps. The term undergarments is used to designate any garment held up by shoulder straps.

The shoulder straps on garments such as brassières, costume slips, athletic waists, corselets and the like become soiled more quickly than the rest of the garment. It is almost impossible to launder the garments especially the corselet and costume slips as often as is necessary to keep the shoulder straps clean.

The shoulder straps on any undergarment usually wear out or become faded before the rest of the garment is worn out. Also it is often desirable to wear shoulder straps conforming to the color of the outer garments. Therefore I have provided a removable shoulder strap which may be interchangeably connected to the undergarments thus enabling the wearer to provide shoulder straps of any desired color and to remove them quickly and easily for the purpose of laundering or to replace them by new ones.

A detachable shoulder strap should be capable of being attached to and removed from the garment without the necessity of employing buttons, hooks and eyes or the like which are objectionable for many reasons, chiefest of which is that buttons are uncomfortable, unsightly and are easily torn from the dainty fabric in the laundry. Hooks and eyes rust and stain the fabric so I have provided a flexible shoulder strap with a transversely stiffened end adapted to pass through an opening in the garment and to lie crosswise of the opening either in the garment or in the shoulder strap so that a connection will be made. The stiffened end may be detached from the garment proper so that the shoulder strap can be easily removed to permit substitution of another strap or for the purpose of laundering and the like.

The invention will be more thoroughly comprehended by reference to the following description in connection with the accompanying drawings, in which.

Figure 1:
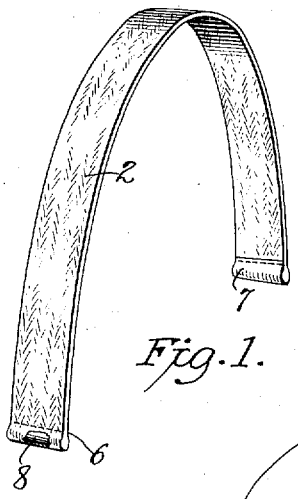
Figure 1 is a perspective view of a shoulder strap constructed in accordance with my invention.

The undergarment 1 is provided with detachable shoulder straps 2 and 3. The garment may be provided with four openings, or eyelets 4. These may be made in any way, the convenient form being to make the opening and bind the edge with button hole stitching. While only two of the eyelets or openings 4 are shown, it is obvious that similar openings will be at the back of the garment. The shoulder straps 2 and 3 are each made of flexible material, preferably of tape, ribbon or the like.

The ends of the shoulder straps are bent back at 6 and 7 to form re-enforcing ends, the double thicknesses 6 and 7 being stitched to provide the stiffened ends. The ends are stiffened transversely preferably by introducing a thin non-corrodible insert 8 so that when the insert is stitched in place, the end of the shoulder strap will be stiff enough to resist bending.

The inserts may consist of bone or other suitable material having diameters less than the openings 4 so that the ends of the shoulder straps can be passed through the openings 4. The stiffened portions can then be turned so that they lie crosswise of the openings 4 so that the shoulder strap will be securely attached. The lengths of the re-enforced portions are at all times greater than the diameters of the openings 4. The shoulder straps can be readily detached from the body of the undergarment by turning the thickened portions so that they may be slipped through the openings 4.

Different colored shoulder straps may be interchanged from time to time to suit conditions and it will be apparent that the fastening means contains no material which will be objectionable to the body of the person wearing the garment or which will be unsatisfactory or liable to rust or corrode.

Figure 2:
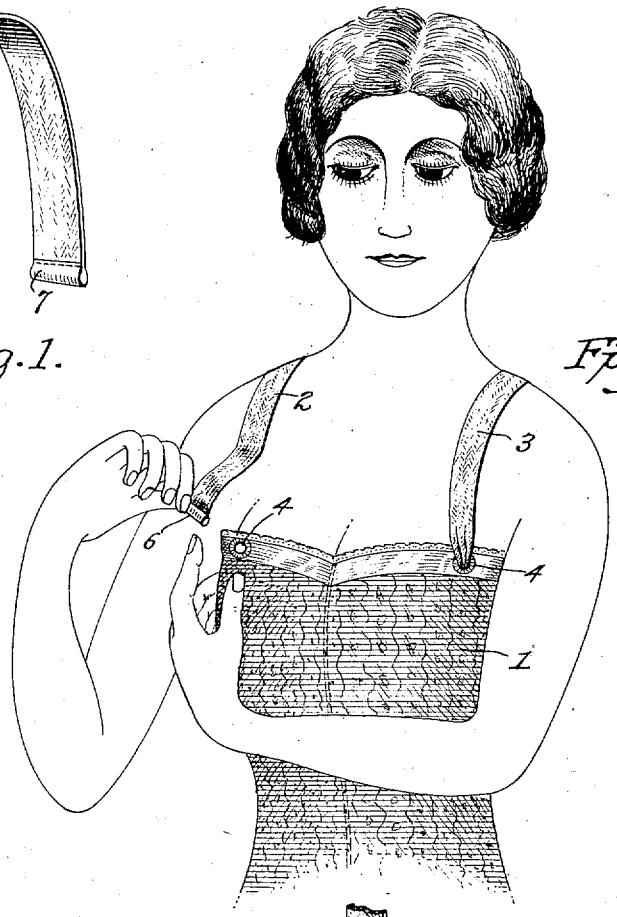
Figure 2 is a perspective view showing the invention applied.
Figure 3:
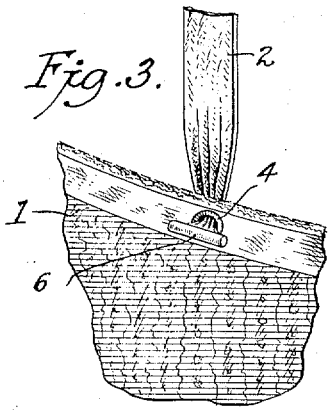
Figure 3 is a fragmentary perspective view of the reverse side of the garment showing the shoulder strap applied.
Figure 4:
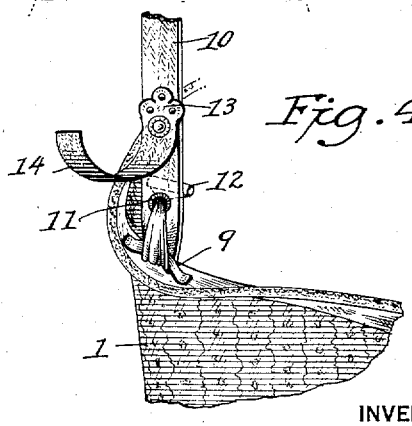
Figure 4 is a fragmentary view of a modified form.

In Figure 4 I have shown a modified form in which there is a loop 9 fastened to the garment. The shoulder strap 10 conforms to the shoulder straps 2 and 3 except that it is provided with an eyelet or opening 11 through which the stiffened portion 12 may pass, the loop formed by the connection being covered by a trimming such as a rosette 13 and a streamer 14. I prefer the construction shown in Figures 1, 2 and 3, however.

In my invention two members are provided, and they are constructed to mutually adapt them for co-operation one with the other to constitute a separable connection unitary with the members themselves, and without resorting to the use of such common expedients as buttons, hooks and eyes, and metallic fasteners. One of said two members is in the form of an article of personal wear provided with an opening, such article being an undergarment, a brassière, costume slip, athletic waist, corselet, or other article of personal wear, whereas the other member is a flexible strap or tape, the width of which usually exceeds the size of the aforesaid opening, and the end of which strap or tape is stiffened to constitute one part of said separable connection, which part is unitary with the flexible member. The flexible member is elongated to perform the functions of a strap adapted to be worn over the shoulder of the wearer, or to be otherwise worn by the wearer, and this flexible member performs certain functions inherent in the separable connection constituting an unitary part of this invention. One of such functions is the capacity of the flexible member to crease or fold lengthwise upon itself adjacent to the stiffened end in the operation of threading the flexible member through the opening in the companion member, and of remaining in such creased or folded condition while present within said opening. This is desirable in a device for personal wear for various reasons, among which are that the flexible member can be made of relatively thin fibrous material corresponding in appearance and color to, and the general utility of, the garment or article with which the flexible member or shoulder strap is associated. Again, the flexible member is quite wide as compared with the opening in the other member or garment, and usually said flexible member is desirably in a flat condition for comfort in wearing the same. The association of a relatively wide flat flexible member with a member having an aperture small in size; makes it a desirable factor to utilize a flexible member in the form of a tape or ribbon composed of fibrous material possessing the capacity of accommodating itself to the relatively small opening in the companion member. Furthermore, the security of the separable connection requires that the opening shall be smaller than the length of the stiffened member co-operable with said opening, in order that the two parts may co-operate in precluding accidental separation of the said two parts. These functions are attained in my improvement requiring an aperture of less size than the length of the stiffened end, and by the employment of a flexible member composed of tape, ribbon or analogous fibrous material which in the operation of threading the flexible member through the opening is free to fold or cross lengthwise and at a point adjacent to the engagement of said flexible member with the edges of the opening, as clearly shown in Figures 1 and 3, and as shown, also, in Figure 4.

In an article of personal wear, it is desirable to overcome the contact of metal with the flesh of the wearer, in order to avoid discoloration of the flesh, and to preclude oxidation of any metal which may be used, and, again, the parts of the separable connection are desirably small and compact to avoid a bulky or cumbrous appearance, and, furthermore, the parts should be susceptible of washing in a laundry without impairing the efficiency of the separable connection. As herein disclosed an opening small in size is formed in the garment, and the edge of the opening is bound by stitching. The end of the flexible member is doubled or folded upon itself at 6, 7, and stitched, and within the doubled edge is positioned the stiffening member 8, the latter being composed of material suitable for the purpose, such as a thin non-corrodible insert. Such stiffening member is encased within the folded and stitched end, and is thus inseparably attached thereto, and is protected by the fibrous material of the flexible member. The folding of the fibrous material, and the employment of a small elongated stiffener, produces a part which is of compact and relatively small size well adapted to function as a member of the separable connection, and to be easily threaded through the small aperture, and to so co-operate with said aperture as to preclude accidental separation of the flexible member in the normal service of the garment. Said stiffening member extends crosswise of the flexible member, transversely to the length thereof, and is substantially encased within the material composing said flexible member, and in the operation of threading the flexible member within the apertured member or part, said folded or doubled end of the flexible member containing the stiffening member is turned to a position wherein the stiffened end enters the aperture and is thus pressed or drawn through said aperture, during which operation the flexible material folds or creases lengthwise adjacent to the stiffened end, as a result of which the stiffened end after passing through the aperture adjusts itself to a position crosswise of the aperture, whereas that part of the flexible material adjacent to the aperture remains in the creased or folded condition, all as shown in Figures 1, 3 and 4 of the drawings. To uncouple or separate the flexible member from the apertured member, the stiffened end should be turned relatively to the length of the fibrous material of said flexible member, and the stiffened end may then be pressed or drawn through the aperture to withdraw the flexible member from the apertured member; but it is to be noted that the relative sizes of the aperture and the stiffened end and the materials themselves are such that the acts of attaching and detaching the flexible member are performed by hand with ease and facility, and at the same time there is only a remote possibility of accidental separation of the flexible member in the normal service of the article.

What I claim and desire to secure by Letters Patent is:

1. In combination, an undergarment having a plurality of holes therein, detachable shoulder straps for the undergarment, each shoulder strap comprising a flexible elongated member, and a rigid stiffening member, the ends of said flexible member having folded back portions secured together about and embracing said stiffening member, said stiffened ends being insertable in the openings and lying across the openings when the shoulder straps are in place, the length of each stiffened portion being appreciably in excess of the diameter of the opening.

2. In an article of personal wear, an apertured part or member, and a flexible member provided with a doubled end portion and with a substantially rigid stiffening member substantially encased therein, the length of said stiffening member exceeding the diameter of the aperture in said apertured part or member, said doubled and stiffened end portion of the flexible member being insertable into and withdrawable from said aperture and said flexible member being composed of textile material having the capacity for creasing or folding by contact with the edge of said aperture upon insertion therein.

3. In an article of personal wear, an apertured part or member, a flexible member composed of textile material with a folded end portion, and a rigid stiffening member encased within said folded end portion and wholly concealed thereby, the length of said stiffening member exceeding the diameter of the aperture of said apertured part or member.

In testimony whereof I affix my signature this 26th day of April, 1927.

ANNETTE FRIDOLPH.